United States Patent [19]

Merkin et al.

[11] Patent Number: 5,754,852

[45] Date of Patent: May 19, 1998

[54] APPARATUS FOR COMBINING CELLULAR TELEPHONE RING SIGNALS AND PSTN RING SIGNALS

[75] Inventors: Cynthia M. Merkin; Stan Merkin, both of Lake Worth, Fla.

[73] Assignee: International Business Machines Corporation, Armonk, N.Y.

[21] Appl. No.: 801,674

[22] Filed: Feb. 18, 1997

Related U.S. Application Data

[63] Continuation of Ser. No. 445,387, May 19, 1995, abandoned, which is a continuation of Ser. No. 179,026, Dec. 29, 1993, abandoned.

[51] Int. Cl.[6] ............................................. G06F 9/445
[52] U.S. Cl. ............................................. 395/651
[58] Field of Search ................................ 395/284, 828, 395/830, 831, 833, 500, 651, 652, 653

[56] References Cited

U.S. PATENT DOCUMENTS

| | | | |
|---|---|---|---|
| 4,974,151 | 11/1990 | Advani et al. | 395/700 |
| 5,161,102 | 11/1992 | Griffin et al. | 395/800 |
| 5,230,052 | 7/1993 | Dayan et al. | 395/700 |
| 5,247,683 | 9/1993 | Holmes et al. | 395/700 |
| 5,253,394 | 10/1993 | Bostick et al. | 395/275 |
| 5,261,104 | 11/1993 | Bertram et al. | 395/700 |
| 5,263,148 | 11/1993 | Jones, Jr. et al. | 395/500 |
| 5,265,238 | 11/1993 | Canova, Jr. et al. | 395/500 |
| 5,280,627 | 1/1994 | Flaherty et al. | 395/652 |
| 5,307,465 | 4/1994 | Iki | 395/325 |
| 5,313,635 | 5/1994 | Ishizuka et al. | 395/700 |
| 5,325,532 | 6/1994 | Crosswy et al. | 395/700 |
| 5,367,667 | 11/1994 | Wahlquist et al. | 395/575 |
| 5,404,527 | 4/1995 | Irwin et al. | 395/652 |
| 5,410,699 | 4/1995 | Bealkowski et al. | 395/652 |
| 5,452,454 | 9/1995 | Basu | 395/652 |
| 5,555,416 | 9/1996 | Owens et al. | 395/712 |

OTHER PUBLICATIONS

MS–Dos 5.0 User Guide and Reference, Dec. 1991 pp. 133–134.

*Primary Examiner*—Glenn A. Auve
*Attorney, Agent, or Firm*—George E. Grosser

[57] ABSTRACT

A method and apparatus for configuring a personal computer system according to the present invention allows a plurality of personal computers of the same type to be configured on a single computer system (which is not necessarily one of the plurality of personal computers that are to be configured). The method includes using a database including a plurality of configuration options to produce a program for storage in an information storage medium to be coupled to each of the plurality of personal computers to automatically configure those systems.

3 Claims, 4 Drawing Sheets

APPARATUS FOR COMBINING CELLULAR TELEPHONE RING SIGNALS AND PSTN RING SIGNALS

This application is a continuation of application Ser. No. 08/445,387 filed on May 19, 1995, now abandoned which is a continuation of application Ser. No. 08/175,026 filed on Dec. 29, 1993, now abandoned.

FIELD OF THE INVENTION

This invention relates to personal computer systems and in particular to a method and system for selectively configuring a personal computer system independently of that system.

BACKGROUND OF THE INVENTION

Personal computer systems in general and IBM® personal computers in particular have attained widespread use for providing computer power to many segments of today's modern society. Personal computer systems can usually be defined as a desk top, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT®, and IBM's PERSONAL SYSTEM/2® Models 25, 30, 40, L40SX, 50, 50Z, 55SX, 57SX, 60, 65SX, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's Micro Channel® bus architecture exemplified by IBM's PERSONAL SYSTEM/2 Models 50 through 95.

The Family I models typically used the popular INTEL 8088 or 8086 microprocessor as the system processor. These processors have the ability to address one megabyte of memory. Later Family I models and the Family II models typically use the higher speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As personal computer technology has developed and moved from eight to thirty-two, and eventually sixty-four bit wide bus interaction and higher speed microprocessors capable of real and protected mode operation, performance capability has been sought by separating the architecture of the personal computer into varying bus areas. More specifically, in the original IBM PC, what came to be known as an expansion bus was essentially a direct extension of the microprocessor (8086 or 8088) connections, buffered and demultiplexed as required. Later, as the AT bus specification was developed and came into wide use (now being also known as the Industry Standard Architecture or ISA), it became possible to sever the nearly direct connection between the microprocessor and the bus, giving rise to the presence of what became known as the local processor bus and the renaming of the expansion bus as the input/output bus. Typically, in order to enhance performance, the local processor bus runs at a higher clock speed (typically expressed in Hertz) than does the input/output bus. The IBM AT architecture also opened the possibility of running more than one microprocessor on the input/output bus, through use of direct memory access (DMA) interrupts. Beginning with the earliest personal computer system of the Family I models, such as the IBM Personal Computer, it was recognized that software compatibility would be of utmost importance. In order to achieve this goal, an insulation layer of system resident code, also known as "firmware", was established between the hardware and software. This firmware provided an operational interface between a user's application program/operating system and the device to relieve the user of the concern about the characteristics of hardware devices. Eventually, the code developed into a BASIC input/output system (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Since BIOS was an integral part of the system and controlled the movement of data in and out of the system processor, it was resident on the system planar and was shipped to the user in a read only memory (ROM). For example, BIOS in the original IBM Personal Computer occupied 8K of ROM resident on the planar board (motherboard).

As new models of the personal computer family were introduced, BIOS had to be updated and expanded to include new hardware and I/O devices. As could be expected, BIOS started to increase in memory size. For example, with the introduction of the IBM PERSONAL COMPUTER AT, BIOS grew to require 32K bytes of ROM.

Today, with the development of new technology, personal computer systems of the Family II models are growing even more sophisticated and are being made available to consumers more frequently. Since the technology is rapidly changing and new I/O devices are being added to the personal computer systems, modification to the BIOS had become a significant problem in the development cycle of the personal computer system. In response to these problems, it became necessary to offload portions of BIOS from ROM. This was accomplished by storing portions of BIOS on a mass storage device such as a fixed disk. In addition to storing BIOS on a mass storage device, storing of system utilities normally contained on a system reference diskette became highly desirable. The elimination of the system diskette not only reduces the price of the system, but provides a more user friendly environment.

It is appropriate at this time to briefly explain the purpose of the system utilities stored on the system reference diskette. With the introduction of IBM's PS/2® Micro Channel Systems came the removal of switches and jumpers from I/O adapter cards (associated with attachable devices) and planar. Micro Channel Architecture provided for programmable registers to replace them. Utilities to configure these programmable registers or programmable option select (POS) registers were required. U.S. Pat. No. 5,038,320 to Heath, et. al. is for a Computer System With Automatic Initialization of Pluggable Option Cards which discloses the operation of POS registers and is hereby incorporated by reference for the purpose of providing possibly relevant background information. In addition, other utilities to improve system usability characteristics, basic device options, along with system diagnostics were shipped with each system on this system reference diskette. Prior to initial use, each Micro Channel System required its POS registers to be initialized. For example, if the system is booted with a new device, or a I/O slot change for an existing device, a configuration error is generated and the system boot up procedure halts. The system will attempt to load the system reference programs from the hard drive. If these programs are not resident on the hard drive, the user is then prompted to load the system reference diskette. A "Set Configuration Utility" can then be booted from the system reference diskette to configure the system. The Set Configuration Utility will prompt the user for the desired action. If the appropriate device's descriptor files reside on the system reference diskette, the Set Configuration Utility will generate the correct POS or configuration data in non-volatile storage. Otherwise, the user must add the appropriate descriptor files to the system reference diskette. A "Copy An Option Diskette Utility" can be used to add the necessary descriptor files. The descriptor file contains configuration information to test the card and to interface the card to the system. Automatic configuration of a computer system is described in U.S. Pat. No. 5,038,320 to Heath et al., which is hereby incorporated by reference.

In some cases, such as in client/server systems for large institutions, a large number of computer systems must be configured. Client/server coordinators require the ability to set the system configuration options for the client workstations nonvolatile memories used for storing system configuration parameters. Currently, the system coordinator must have access to each client work station to preset the desired configuration for that computer system. This operation is time consuming and requires a resource (i.e., the client work station) that might not otherwise be required in the coordinator's work area. Such large institutions often buy large numbers of work stations of the same type. Configuration of these work stations one at a time is a time consuming process.

Additionally, some work stations include Vital Product Data (VPD) as part of their configuration information. The VPD includes a unique identifier for that system making the configuration information work-station-specific. When the configuration information is preset on such a system, the restoration of the configuration on other systems of the same type do not make adjustments for the VPD's uniqueness.

SUMMARY OF THE INVENTION

The present invention has been developed for the purpose of solving the above mentioned problems. Broadly considered, a method and apparatus for configuring a personal computer system according to the present invention allows a plurality of personal computers of the same type to be configured on a single computer system (which is not necessarily one of the plurality of personal computers that are to be configured). The method comprises using a database including a plurality of configuration options to produce a program for storage in an information storage medium to be coupled to each of the plurality of personal computers to automatically configure those systems.

DESCRIPTION OF THE ILLUSTRATIVE EMBODIMENT

While the present invention will be described more fully hereinafter with reference to the accompanying drawings, in which a preferred embodiment of the present invention is shown, it is to be understood at the outset of the description that follows that persons of skill in the appropriate arts may modify the invention here described while still achieving the favorable results of this invention. Accordingly, the description which follows is not to be taken in a limiting sense but is made merely for the purpose of illustrating the general principles of the invention since the scope of the invention is best defined by the appending claims.

Figure 1:
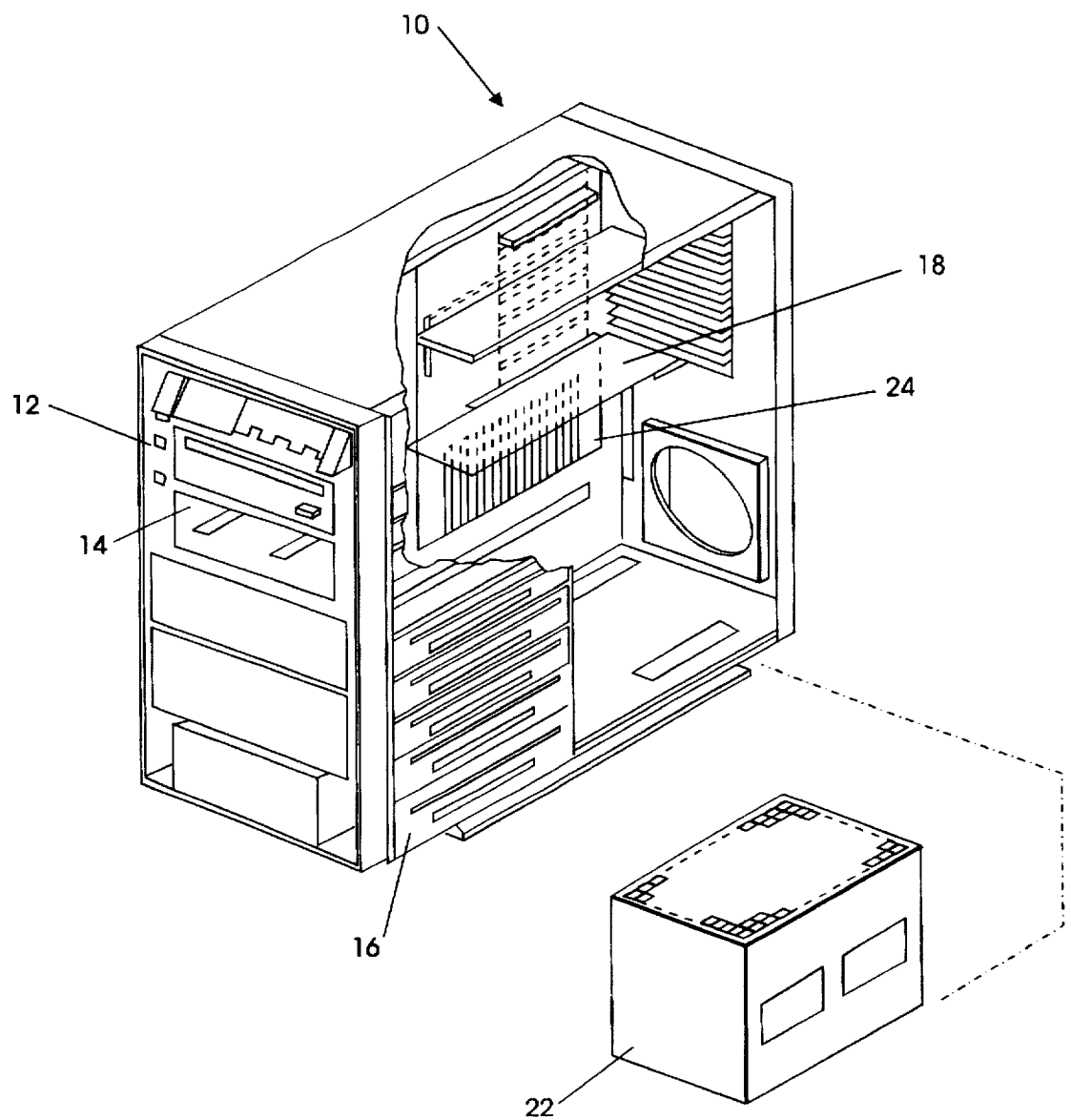
FIG. 1 illustrates a cut away view of a personal computer system showing a system planar board connected to a plurality of direct access storage devices.

Referring now to the drawings, and in particular to FIG. 1, there is shown a cutaway version of a personal computer system 10, having a plurality of DASD (Direct Access Storage Devices) 12–16 connected to a system or planar board 24 through a plurality of I/O slots 18. A power supply 22 provides electrical power to the system 10 in a manner well known. The planar board 24 includes a system processor which operates under the control of computer instructions to input, process, and output information.

In use, the personal computer system 10 is designed primarily to give independent computing power to a small group of users or a single user and is inexpensively priced for purchase by individuals or small businesses. In operation, the system processor operates under an operating system, such as IBM's OS/21 Operating System or DOS. This type of operating system includes a BIOS interface between the DASD 12–16 and the Operating System. A portion of BIOS divided into modules by function is stored in ROM on the planar 24 and hereinafter will be referred to as ROM-BIOS. BIOS provides an interface between the hardware and the operating system software to enable a programmer or user to program their machines without an indepth operating knowledge of a particular device. For example, a BIOS diskette module permits a programmer to program the diskette drive without an indepth knowledge of the diskette drive hardware. Thus, a number of diskette drives designed and manufactured by different companies can be used in the system. This not only lowers the cost of the system 10, but permits a user to choose from a number of diskette drives.

Figure 2:
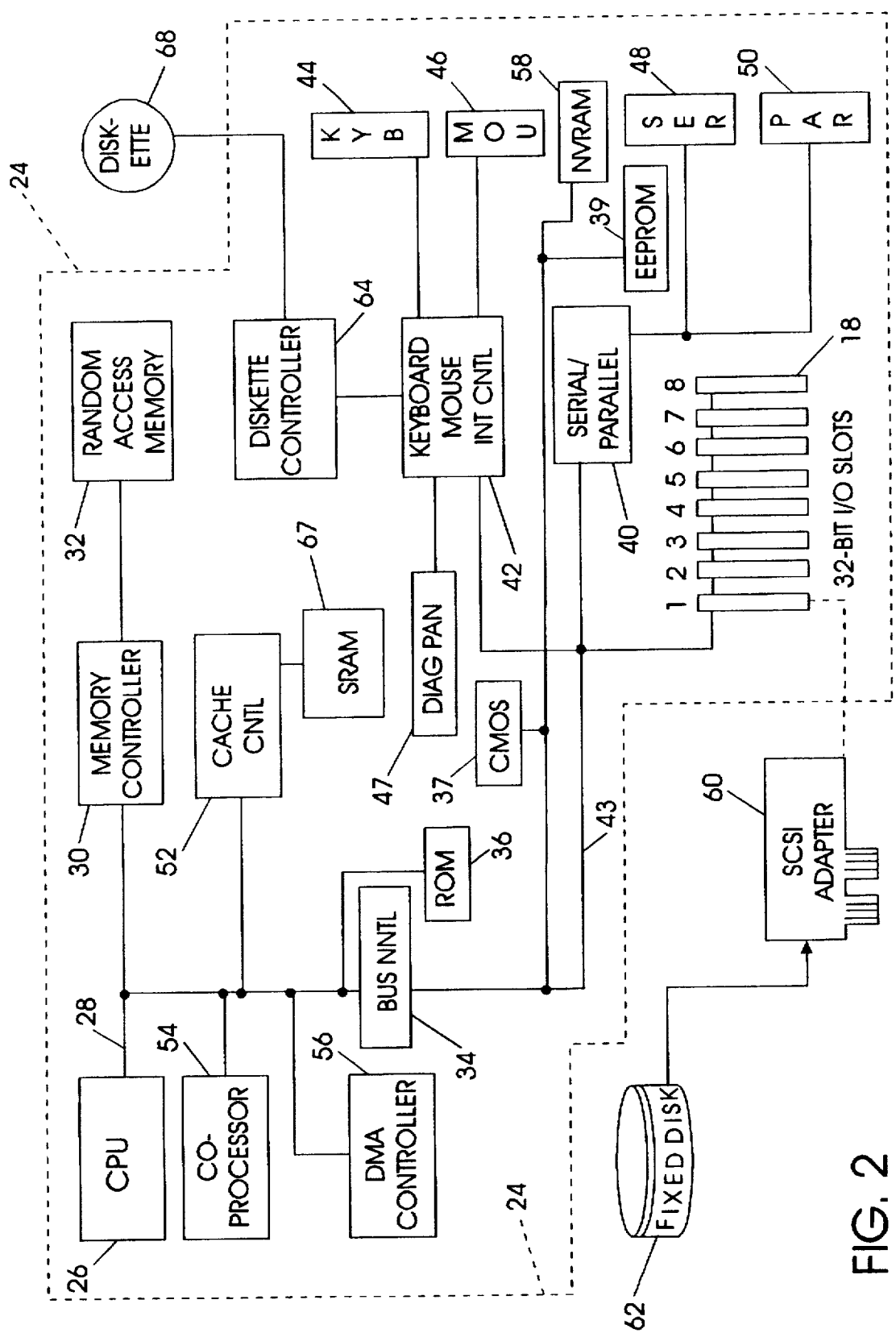
FIG. 2 shows a system block diagram for the personal computer system of FIG. 1.

Prior to relating the above structure to the present invention, a summary of the operation in general of the personal computer system 10 may merit review. Referring to FIG. 2, there is shown a block diagram of the personal computer system 10 in accordance with the present invention, including components mounted on the planar 24 and the connection of the planar to the I/O slots and other hardware of the personal computer system. Accordingly, FIG. 2 illustrates components of the planar 24 and the connection of the planar 24 to the I/O slots 18-1 to 18-8, into which I/O options cards (not shown) may be interchangeably plugged, and other hardware of the personal computer system. These cards control various types of peripheral devices (disk drives, printers, etc.) and add-on memory which are either integrally contained on respective cards or attached thereto via external connectors.

Located on the planar 24 is the primary system processor 26 which comprises a microprocessor connected by a local bus 28 to a memory controller 30, which is further connected to a random access memory (RAM) 32. While any appropriate microprocessor can be used, one suitable microprocessor is the 80486 which is sold by Intel. The local bus 28 is further connected through a bus interface controller (BIC) 34 to a read only memory (ROM) 36 on the planar 24.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel Pentium microprocessor.

The bus interface controller 34 couples the CPU local bus 28 with the I/O bus 43 and functions as a protocol translator among other functions. By means of the I/O bus 43, the bus interface controller 34 is coupled with an optional feature bus such as a Micro Channel bus having a plurality of I/O slots 18-1 to 18-8 for receiving Micro Channel adapter cards, a serial/parallel interface 40, and peripheral controller 42. The I/O bus 43 includes address, data, and control components. Moreover, the I/O bus 43 may be configured to bus specifications other than the Micro Channel specification. A feature of Micro Channel is that POS registers can address I/O slots 18-1 to 18-8 by "slot address" signals on the address lines of I/O bus 43 during setup routines, and cards residing in the I/O slots can be separately addressed by "I/O address" signals on the address lines during normal program execution; where the slot addresses and I/O addresses are distinctly different values associated respectively with physical locations of the I/O slots and with the types of devices currently attached. Many different types of devices are each potentially attachable to any one of the few I/O slots of the system. In this case, a SCSI (small computer system interface) adapter card is plugged into slot 18-1.

The peripheral controller 42 is further connected to a keyboard 44, mouse 46, diagnostic panel 47, and diskette controller 64. A serial/parallel interface 40 is connected to a serial port 48 and parallel port 50 to input/output information to a printer, hard copy device, etc. As is well known in the art, the local bus 28 can also be connected to a cache controller 52, a co-processor 54, and a DMA controller 56. The cache controller 52 is also connected to a 128 kb SRAM cache 67.

A nonvolatile memory (NVRAM) 58 is connected to the microprocessor 26 through the serial/parallel port interface 40 which is further connected to bus interface controller 34. The nonvolatile memory (NVRAM) can be CMOS with battery backup to retain information whenever power is removed from the system. Since the ROM is normally resident on the planar, model and submodel values stored in ROM are used to identify the system processor and the system planar I/O configuration respectively. Thus these values will physically identify the processor and planar I/O configuration.

The NVRAM 58 and CMOS 37 are used to store system configuration data. That is, the NVRAM will contain values which describe the present configuration of the system. For example, NVRAM contains information describing the capacity of a fixed disk 62 or diskette 68, the type of display, the amount of memory, time, date, etc. Within the NVRAM, a separately addressable space is allocated to each I/O slot 18-1 to 18-8, for storing Programmable Option Select (POS) parameter information relative to the current configuration of the I/O slot. When the I/O slot is occupied, this parameter information includes an identity value ID, an addressing factor AD, a priority value PR, a state bit S, and other information. A register in each attached device option card (not shown) stores parameter information for controlling communications between the attached device and the processing system, including the address factor AD, the priority value PR, and the state bit S, and other information described with respect to NVRAM. On some systems there is a third non-volatile information storage device (EEPROM 39, in this case). This device is used to store security information, VPD, and startup sequence passwords, for example.

Programmable Option Select (POS) register information is set in the device option card register by the processing system during power-up initialization. Additionally, the model and submodel values stored in ROM are copied to NVRAM whenever special configuration utilities, such as the Set Configuration utitlity, are executed. The purpose of the Set Configuration utilitiy is to store values characterizing the configuration of the system in NVRAM and CMOS.

If the model and submodel values are not equal, or if the I/O slot conditions have changed since the last power down of the processing system, the system will indicate that the configuration of the system has been modified requiring the Set Configuration utility to be run. The explanation will now proceed to the operation of the system reference diskette and to the procedure of affording a user the option of selecting either the primary system processor 26 or the alternate processor to be stored in NVRAM and subsequently loaded in the bus interface controller 34. The coding of steps as described into instructions or a program product suitable to control the system processor will be understandable to one having ordinary skill in the art of programming. In general, the system reference diskette may offer a user the following utilities: start the operating system, backup/restore system programs, update system programs, set configuration, set features, copy an option diskette, and test the computer.

In accordance with the invention, an additional utility is provided enabling the remote configuration of any personal computer system. This is accoplished by a utility and a supporting database of system and adapter options. The utility is loaded into a configuring computer system. The user is presented with a menu of computer system types present in the database, asking the user to select a target computer system(i.e., the one to be configured). Once the target system is selected, the utility program "knows" the following configuration information:

(1) the configuration-recording structure of the system's nonvolatile storage;
(3) the options that are directly attached to the system planar;
(3) the type of adapter bus (or busses)supported by the system;
(4) the number of expansion slots available for each bus type;
(5) the memory options available to the system;
(6) the number of DASD bays available to the system;
(7) whether or not the system includes VPD information;
(8) other system-specific options.

The utility program allows the user to specify the target system's hardware configuration, based upon the installation options available for that system. The user uses the utility program to associate option adapters to specific system slots, to define the the amount (and, possibly, type) of system memory present in the system, and to identify any system-specific hardware options for the system.

Once the user has finished customizing the target system's configuration, the user instructs the program to save the configuration to a file (or set of files) for future restoration to the target system. An additional option in the utility program performs the configuration restoration for the target system, setting the preset configuration into the target system's nonvolatile storage. If the target system includes VPD information, the utility program maintains the current nonvolatile storage settings of the system's unique VPD information.

Figure 3:
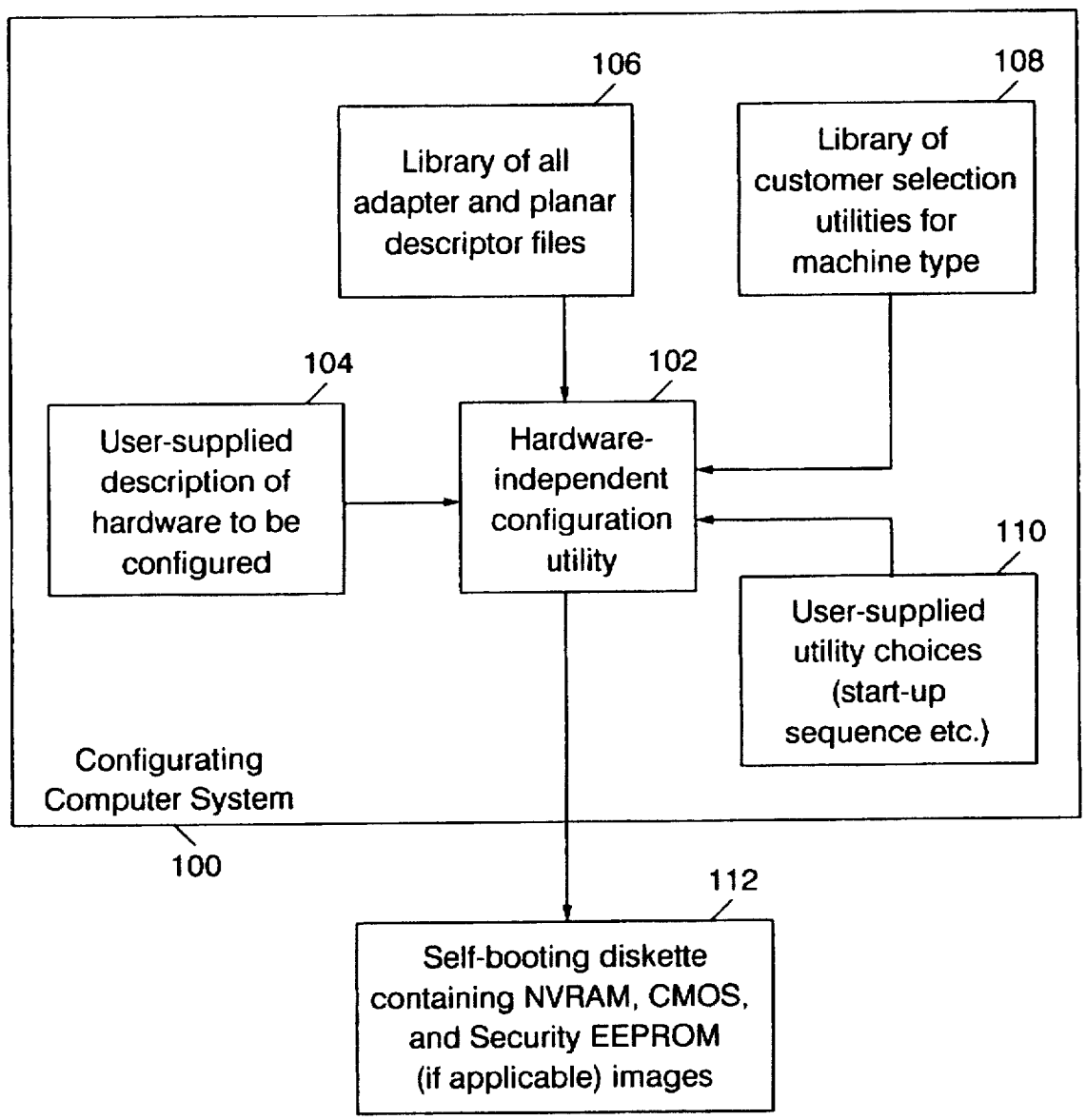
FIG. 3 is a block diagram illustrating an embodiment of the present invention.

Referring to FIG. 3, a block diagram illustrates the operation of a configuring computer system 100 in accordance with the invention. The configuring computer system 100 (which can be any computer system such as personal computer system 10, shown in FIGS. 1 and 2) includes a hardware-independent configuration utility 102 in accordance with the invention. The utility 102 uses a user-supplied description (104) of the hardware of the target system(s) to be configured and user-supplied utility choices 110 (such as the startup sequence) to access various libraries (databases) including system configuration data to produce a self-booting diskette containing the required NVRAM, CMOS, and security EEPROM (if applicable) images for the target system. A library (106) of all adapter and planar descriptor files, and a library (108) customer selection utilities for machine (system)type are stored in the configuring system to provide the required configuration data. The diskette 112 can be inserted into the target system either before or after power on, and once read by the target system, it automatically configures the target system by restoring the NVRAM, CMOS, and EEPROM images into the target system.

Figure 4:
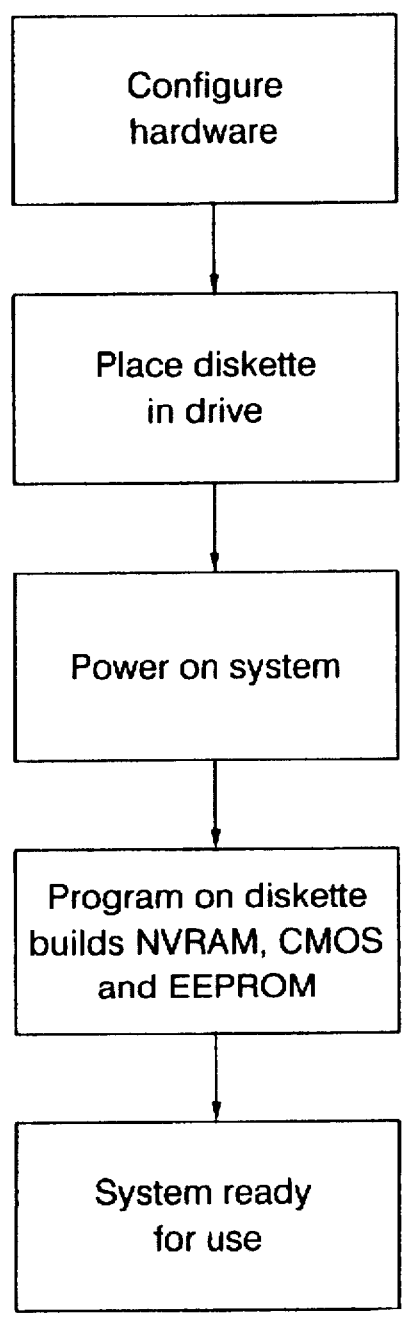
FIG. 4 is a flow chart illustrating a method in accordance with the present invention.

One possible procedure for using the diskette 112 in the target system is shown in FIG. 4. This procedure begins at the remote configuring system 100, wherein the configuration data is established with user assistance. The configuration data is the written to the diskette 112 (or any other suitable portable storage medium) and the diskette is placed in the diskette drive of the target system. The target system is powered-on and the program contained in the diskette builds the NVRAM, CMOS, and EEPROM images in the target system with no (or minimal) user intervention required. Thus, configuration of the target system is done quickly in a user-friendly manner.

While the invention has been illustrated in connection with a preferred embodiment, it should be understood that many variations will occur to those of ordinary skill in the art, and that the scope of the invention is defined only by the claims appended hereto and equivalent.

What is claimed is:

1. A method for configuring one or more target computers having similar hardware configuration, without running a configuration utility at such targets, based on selections by a user at a configuring computer system, said method comprising the steps of:

displaying alternatives for computer system types for user selection using a database of system candidates stored in said configuring system;

receiving and recording, at said configuring system, a user selection of a system type for said target system from said system type alternatives;

displaying alternatives for individually installable computer options, for the system type selected, for user selection using a database of option candidates stored in said configuring computer system;

receiving and recording, at said configuring computer system, user selections for options for said target system from said individually installable option alternatives;

determining, using information stored in said configuring system, the configuration data corresponding to said recorded selections of system type and options;

recording the configuration data image at the configuring computer system on a medium to be transferrable to a target system of the type selected, along with system programs required to cause such target system to boot and write the configuration data image at a configuration storage thereof; transferring said configuration data image and system programs to a target system; and powering said target system so as to cause it to boot and receive the configuration data image at the configuration storage for said target system.

2. The method of claim 1 wherein the configuring system is of a different system type than the target system.

3. The method of claim 1 wherein the medium is a diskette.

* * * * *